United States Patent
Leppänen

(10) Patent No.: US 7,663,850 B2
(45) Date of Patent: Feb. 16, 2010

(54) EARTH FAULT PROTECTION OF A FREQUENCY CONVERTER

(75) Inventor: Ora Veli-Matti Leppänen, Helsinki (FI)

(73) Assignee: ABB OY, Helsinki (FI)

( * ) Notice: Subject to any disclaimer, the term of this patent is extended or adjusted under 35 U.S.C. 154(b) by 90 days.

(21) Appl. No.: 12/000,525

(22) Filed: Dec. 13, 2007

(65) Prior Publication Data

US 2008/0151445 A1    Jun. 26, 2008

(30) Foreign Application Priority Data

Dec. 14, 2006  (FI) ................................. 20065805

(51) Int. Cl.
*H02H 3/00* (2006.01)
(52) U.S. Cl. ........................................ 361/43
(58) Field of Classification Search .............. 361/42, 361/44, 78, 43
See application file for complete search history.

(56) References Cited

U.S. PATENT DOCUMENTS

| | | | | |
|---|---|---|---|---|
| 5,444,333 A | * | 8/1995 | Lau ................ | 315/94 |
| 5,877,926 A | * | 3/1999 | Moisin ............ | 361/42 |
| 5,901,057 A | * | 5/1999 | Brand et al. ..... | 363/144 |
| 6,381,110 B1 | * | 4/2002 | Nagashima et al. | 361/23 |
| 7,233,465 B2 | * | 6/2007 | Lee .................. | 361/42 |
| 2005/0099743 A1 | | 5/2005 | Lee | |
| 2008/0278108 A1 | * | 11/2008 | Choi et al. ........ | 318/715 |

FOREIGN PATENT DOCUMENTS

| | | |
|---|---|---|
| JP | 5-126870 A | 5/1993 |
| JP | 2000-116144 A | 4/2000 |
| WO | WO 2006/069568 A1 | 7/2006 |

OTHER PUBLICATIONS

Finnish Application Official Action, Apr. 19, 2008.

* cited by examiner

*Primary Examiner*—Stephen W Jackson
*Assistant Examiner*—Angela Brooks
(74) *Attorney, Agent, or Firm*—Buchanan Ingersoll & Rooney PC

(57) ABSTRACT

A method in connection with a frequency converter, which frequency converter comprises output phases and switches of the output phases, the output phases being switched to feed a load, and the main circuit of the frequency converter being provided with common-mode inductance. The method comprises a step where, in case of earth fault, switches of the output phase having an earth fault are modulated in such a way that the average potential of this phase corresponds to the ground potential.

11 Claims, 2 Drawing Sheets

EARTH FAULT PROTECTION OF A FREQUENCY CONVERTER

BACKGROUND OF THE INVENTION

The invention relates to earth fault protection of a frequency converter and particularly to a method that enables limiting the earth fault current of a frequency converter.

A frequency converter is an electric device used for controlling a load. One frequency converter structure comprises a direct voltage intermediate circuit, the voltage of which is generated of supply voltage, such as three-phase voltage of the supply network, with a rectifier. This rectified voltage of the direct voltage intermediate circuit is then switched with an inverter part to the load in such a way that the desired voltage on average is generated in the load. The output voltage of the frequency converter is thus generated of individual direct voltage pulses, the duration of which is modulated for instance by controlling with a current controller.

A phase-to-earth fault in the motor cable of a frequency converter or in the motor causes fault current in an earthed network from the supply side, which may break the frequency converter. Earlier, fault current was indicated by measuring the sum of currents in the motor phases, input phases or intermediate circuit, and when this sum deviated from zero, fault trigger was carried out. The sum of the currents in the motor phases, i.e. output phases, is zero in a normal operating situation, because typically the loads have no separate return conductor, but all current going to the motor returns along supply conductors. There are also methods in which the indication of a fault situation is based on measuring voltages.

The sum of the currents may be measured either by separately measuring the currents to be added together and generating their sum, or by conducting the currents to be added together through a common current transformer. Since, in any case, the phase currents of a motor are usually to be measured for motor control purposes, it is rather common to measure three phase currents separately and to calculate their sum to detect the earth fault situation. However, in cases where it is desirable that the control of a motor be based on measuring only two phase currents, an inexpensive current transformer has often been used for measuring the summation current, whereby the main circuit of the frequency converter is conducted through this current transformer, i.e. either three input phases, two intermediate circuit conductors (dc+ and dc−) or three output phases.

However, measuring the summation current is problematic in view of the dimensioning of the measuring circuit: if, for example, the sum of three output currents is to be measured with a current transformer, the primary circuit of the transformer must be dimensioned for three different coils, each of which must have a conductor of the magnitude of the rated current, although the actual object of measuring, i.e. the summation current, is zero with regard to thermal dimensioning.

The methods based on measuring voltages are appealing specifically for the reason that in case of earth fault, the potential differences are measurable with high-impedance and thus inexpensive circuits. Roughly speaking, the detection methods of an earth fault based on measuring voltages can be divided into two categories: those measuring voltage between the main circuit of the frequency converter (e.g. potential of the mid-point of the intermediate circuit) and the ground potential, and those measuring voltage loss caused by the earth fault current (e.g. from the poles of a filter reactor divided evenly between the dc+ and dc− busbars). An earth fault situation is in both cases detectable from the abnormal behaviour of the voltage.

Further, a difficulty with all known earth fault indication methods is that indication cannot be made very fast. This is because common-mode current (and corresponding potential swings) is related with switch turns of an inverter also in normal situations. The potential of the motor phase typically swings from dc− level to dc+level (and back) within clearly less than a microsecond. Thus, when charging and discharging, the earth capacitances of the motor and motor cable take rather high-amplitude—yet short—current bursts with oscillation. Due to this, the indication must be carried out fairly slowly with filtering, and the trigger limit cannot be set very near zero in the case of a summation current.

BRIEF DESCRIPTION OF THE INVENTION

An object of the invention is to provide a method in such a way that the above problems can be solved. The object of the invention is achieved with a method characterized by what is stated in the independent claim. Preferred embodiments of the invention are disclosed in the dependent claims.

The invention is based on the idea that the modulation of the phase having an earth fault is changed in such a way that the earth fault current cannot increase uncontrollably. This can be implemented simply by modulating the switches of the phase having the earth fault in such a way that the potential of this phase corresponds, on average, to the ground potential.

An advantage of the method according to the invention is simple operation with which the frequency converter can be protected against breaking down in connection with an earth fault. Further, controlling the load can be continued despite the earth fault, although this must be done with a lower voltage than in a state where there is no fault.

BRIEF DESCRIPTION OF THE FIGURES

The invention will now be described in more detail in connection with preferred embodiments, referring to the attached drawings, of which.

DETAILED DESCRIPTION OF THE INVENTION

Figure 1:
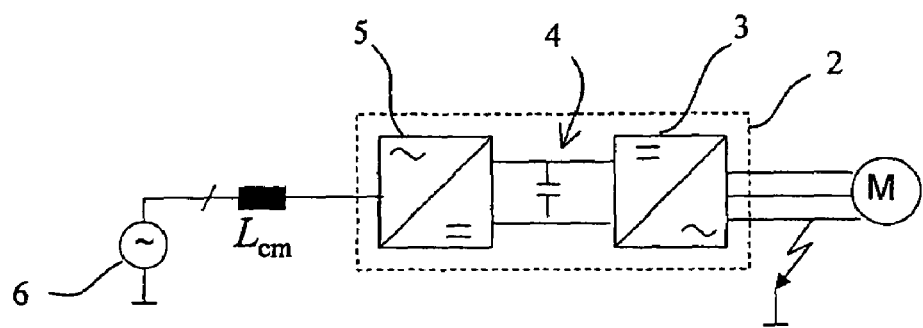
FIG. 1 shows a block diagram of a frequency converter feeding a motor in connection with a phase-to-earth fault.

FIG. 1 illustrates a situation where one phase of a motor M fed by a frequency converter 2 has an earth fault. The frequency converter is shown as a block diagram as being formed of a rectifier 5, a direct voltage intermediate circuit 4 and an inverter 3. The supply network 6 of FIG. 1 is earthed.

In regard of the method, it is important that there be common-mode inductance on the path of the main circuit of the frequency converter, i.e. in the earth fault circuit of an earth fault possibly generated. In the case of FIG. 1, common-mode inductance $L_{cm}$ is positioned at the input of the frequency converter. The inductance might also be in the intermediate circuit or output phases of the frequency converter.

When an earth fault of one output phase occurs in the circuit shown by FIG. 1, the earth fault circuit closes via the earthing of the supply network, whereby current flows through the frequency converter and, if not limited, may damage the frequency converter.

In the method according to the invention, in case of earth fault, switches of the output phase having an earth fault are modulated in such a way that the average potential of this phase corresponds to the ground potential. When applying the invention, the current of the common-mode inductance (i.e. earth fault current) cannot grow adversely great.

In accordance with a preferred embodiment of the invention, modulating an inverter is based on controlling the phase currents of the output of a frequency converter. The phase currents are given instructions, so that a zero sum condition is fulfilled:

$$i_a + i_b + i_c = 0 \quad (1)$$

Thus, no current that would be detrimental to the frequency converter itself gets to the earth fault circuit. Modulation of the phase having the earth fault changes, due to the current control based on the zero sum, in such a way that there is a zero-average voltage over the inductance $L_{cm}$. Thus, when applying the embodiment, there is no need to separately indicate the earth fault for changing the modulation. In a normal state, the zero sum condition of equation (1) is always fulfilled, so that a condition limiting the sum of currents may be as a continuous implementation in the frequency converter. In the solution of the invention, this zero sum condition is also implemented in an earth fault situation.

Figure 2:
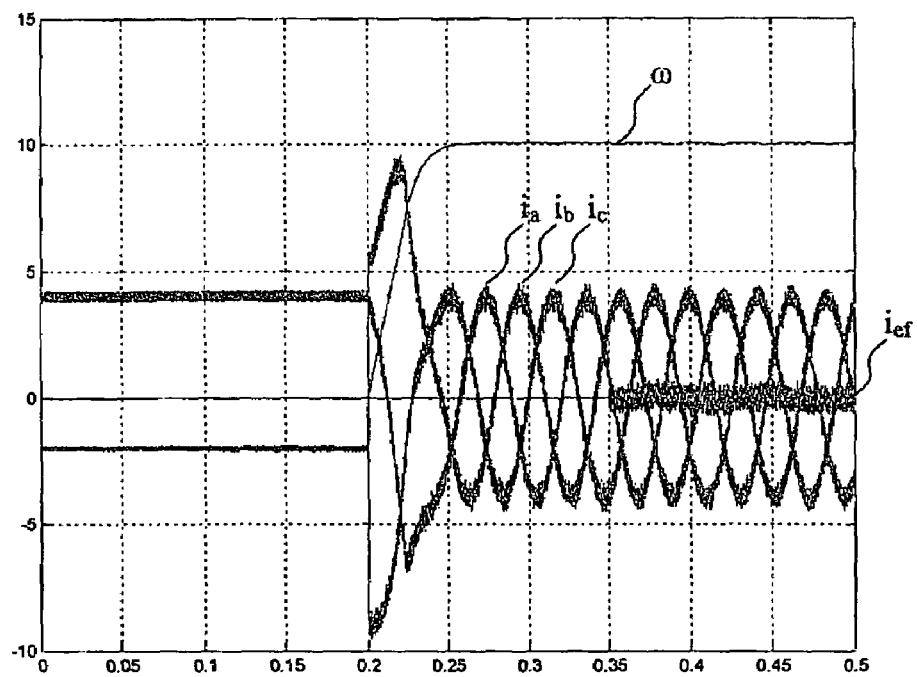
FIG. 2 shows simulated currents of the output phases and the earth fault circuit in connection with an earth fault.

Simple simulation of an inverter provided with phase-specific hysteresis current controllers (point-to-point control) illustrates the functioning of the method according to the invention. FIG. 2 shows a simulation result, in which the motor is first magnetized with direct current during the time 0 ... 0.2 s, after which the motor is accelerated to a speed (to value 10 on the scale of FIG. 2) corresponding to the output frequency of about 16 Hz. At the moment of time 0.35 s, one of the motor phases gets an earth fault. The phase currents $i_a$, $i_b$, $i_c$ and the speed ω of the motor do not change much. The high-frequency earth fault current $I_{ef}$ stays, thanks to the zero sum condition (1), controllably near zero.

Figure 3:
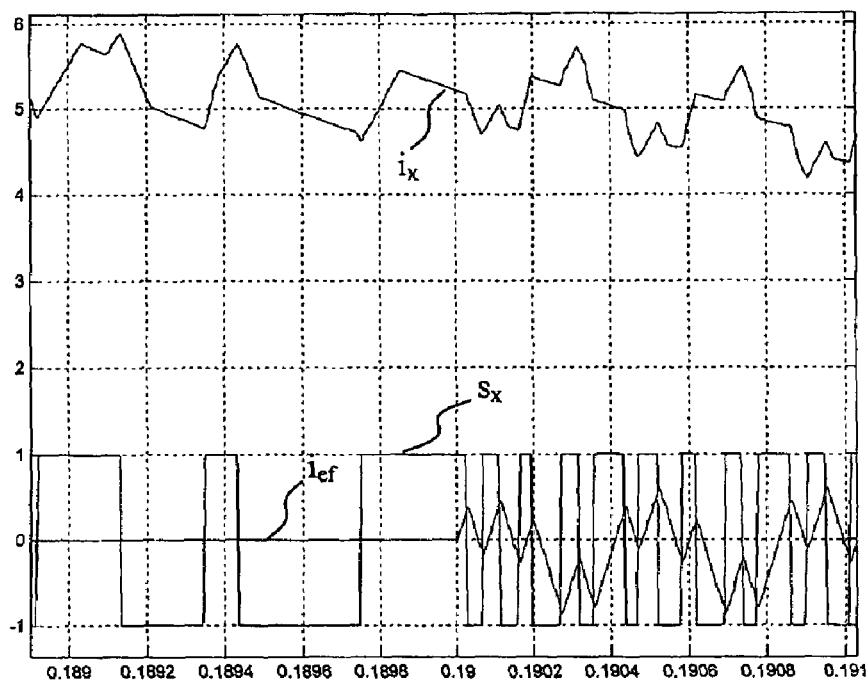
FIGS. 3 and 4 show simulated current, modulating signal and earth fault current of a phase having an earth fault.

FIG. 3 shows a second simulation result. Here, an earth fault is generated at the moment of time 0.19 s, on both sides of which a time period of about one millisecond is shown. The uppermost curve is the current $i_x$ of the phase having the earth fault, i.e. a period of about two milliseconds of sinusoidal signal having switching-frequency distortion.

FIG. 3 also shows the current $I_{ef}$ of the earth fault circuit, the magnitude of the current being naturally zero before the earth fault of the moment of time 0.19. Further, FIG. 3 shows the modulating signal $s_x$ of the phase having the earth fault, which signal is detected to change into a zero-average signal at the moment of the earth fault. At the same time, the switching frequency of this phase increases to about threefold compared with a normal state. The switching frequency is determined, in case of simulation, by the hysteresis limits of the point-to-point control and the inductance of the earth fault circuit. The switching frequency increases because, due to the earth fault current, the current of the phase having the earth fault tends to change faster than in a normal run.

The set of curves in FIGS. 2 and 3 are provided by simulating operation according to the invention, where, in case of an earth fault, switches of the output phase having an earth fault are modulated in such a way that the average potential of this phase corresponds to the ground potential. In other words, the modulating signal $s_x$ controlling the switches of the phase having the earth fault is a zero-average signal and generates thus in this phase potential that has a zero average relative to the ground. Modulation according to FIG. 2, in particular, is provided by means of current controllers by controlling the summation current of the output phases to zero. Modulation of other phases is not significantly affected by the earth fault. In the simulation of FIG. 3, the inductance of the earth fault circuit is substantially of the magnitude of the total distributed inductance of the motor used in the simulation.

In accordance with another preferred embodiment of the invention, modulating the voltage of the phase having an earth fault to a zero average may be carried out also without three-phase current control of the type described above. In accordance with this embodiment, the earth fault situation and the output phase having the earth fault are detected, and the voltage of the output phase having the earth fault is controlled to have a pulse ratio of 50%. An earth fault situation may be detected by measuring common-mode current for instance from the intermediate circuit (summation current of busbars dc+ and dc−) of the frequency converter. The zero current condition (1) may also be presented by means of this summation current:

$$i_a + i_b + i_c = i_{dc+} + i_{dc-} = 0. \quad (2)$$

Figure 4:
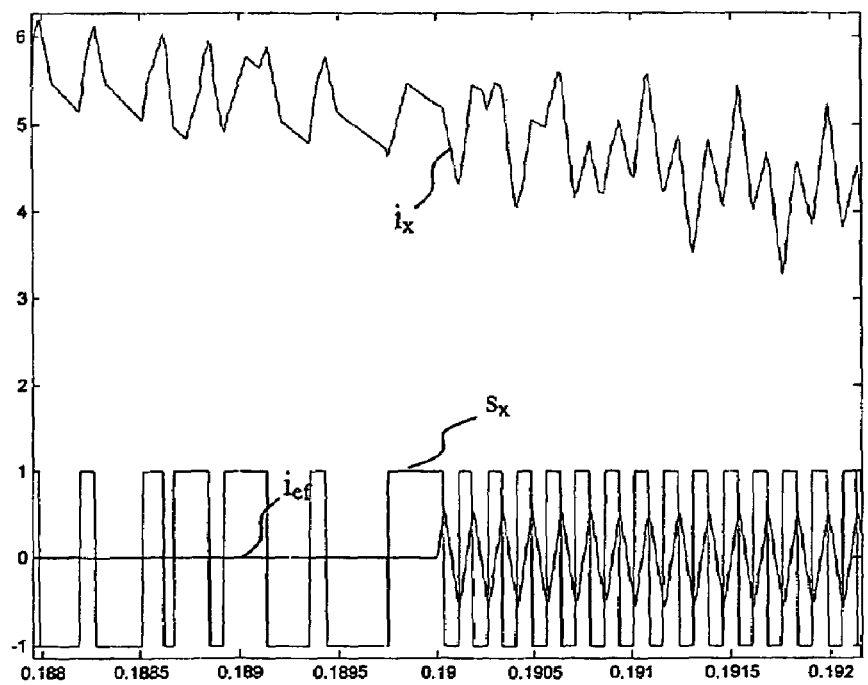

In this case, however, at the latest when the summation current deviates from zero, it is to be found out which of the output phases have the earth fault, for example on the basis of the potential difference between the different output phases and the ground in a manner known as such. The earth fault current can thus be controlled to be zero by controlling the phase in question with the pulse ratio 50%-50%. FIG. 4 shows the simulation result in such a situation. Before the earth fault, phase currents are controlled in the manner required by the normal operating situation. The earth fault occurs at the moment 0.19 s, after which the summation current $i_{dc+} + i_{dc-}$ is controlled to be zero with the modulation of the phase having the earth fault. The symbols of the curves in FIG. 4 correspond to the ones used in FIG. 3. In the manner shown in FIG. 4, the modulating signal $s_x$ is changed at the earth fault moment to have a zero average (pulse ratio 50%-50%). The frequency of the modulating signal directly affects the magnitude of the earth fault current. Upon detecting the earth fault current, the frequency of the modulating signal may be set, with regard to the phase having the earth fault, arbitrarily to limit the magnitude of the earth fault current. The frequency may be selected to be, for example, three times the frequency of the average normal situation.

Modulation may also be based on controlling the sum of the output currents, in which case an earth fault is detected, the phase having the earth fault is determined, and the modulation of this phase is controlled in such a way that the summation current becomes zero.

Phase-specific hysteresis current controllers were used in the simulations. Also other kinds of current controllers may be used, such as PI or dead-beat types. What is essential is that the zero sum condition (1) should be fulfilled.

It will be obvious to a person skilled in the art that as the technology advances, the basic idea of the invention may be implemented in a plurality of ways. The invention and its embodiments are thus not restricted to the above examples but may vary within the scope of the claims.

The invention claimed is:

1. A method with a frequency converter that comprises output phases having switches for feeding a load and that includes a main circuit with a common-mode inductance, the method comprising:
in response to an earth fault, modulating switches of an output phase among the output phases having the earth fault in such a way that the average potential of the output phase having the earth fault corresponds to the ground potential.

2. A method according to claim 1, wherein the modulation comprises steps of:

determining the magnitude of the sum of currents in the output phases of the frequency converter; and controlling the sum of the currents in the output phases of the frequency converter to be zero.

3. A method according to claim 2, wherein the magnitude of the sum of the currents in the output phases is determined by measuring the current of each output phase separately.

4. A method according to claim 2, wherein the sum of the currents in the output phases of the frequency converter is controlled to be zero by means of current controllers of each output phase.

5. A method according to claim 1, wherein the modulation comprises steps of:

determining the earth fault and the output phase having the earth fault; and controlling the voltage of the output phase having the earth fault to have a pulse ratio of 50%.

6. A method according to claim 5, wherein detection of the earth fault comprises steps of:

determining common-mode current of the main circuit of the frequency converter; and detecting a common-mode current component in the main circuit.

7. A method according to claim 6, wherein the common-mode current is detected by determining a summation current of the input of the frequency converter, of an intermediate circuit of the frequency converter, or of the output of the frequency converter by means of one current measuring member.

8. A method according to claim 5, wherein the output phase having the earth fault is detected by measuring a common-mode voltage of each phase.

9. A method according to claim 3, wherein the sum of the currents in the output phases of the frequency converter is controlled to be zero by means of current controllers of each output phase.

10. A method according to claim 6, wherein the output phase having the earth fault is detected by measuring a common-mode voltage of each phase.

11. A method according to claim 7, wherein the output phase having the earth fault is detected by measuring a common-mode voltage of each phase.

* * * * *